United States Patent [19]

Zehnder et al.

[11] 4,357,048
[45] Nov. 2, 1982

[54] SUPERSTRUCTURE FOR ROAD AND RAIL VEHICLES

[75] Inventors: Jürg Zehnder, Zurich; Jann Grischott, Uster, both of Switzerland

[73] Assignee: Swiss Aluminium Ltd., Chippis, Switzerland

[21] Appl. No.: 216,088

[22] Filed: Dec. 15, 1980

[30] Foreign Application Priority Data

Dec. 20, 1979 [CH] Switzerland .................. 11326/79

[51] Int. Cl.³ ............................................. B62D 25/02
[52] U.S. Cl. ..................................... 296/183; 52/403; 105/422
[58] Field of Search ............... 296/183, 182, 187, 188, 296/204, 29, 36; 52/403, 393; 105/404, 397, 413, 412, 414, 422

[56] References Cited

U.S. PATENT DOCUMENTS

| | | | |
|---|---|---|---|
| 1,943,588 | 1/1934 | Dinstbir | 296/29 |
| 3,132,604 | 5/1964 | Collins et al. | 105/422 |
| 3,252,730 | 5/1966 | Chieger et al. | 296/181 |
| 4,151,802 | 5/1979 | Miller et al. | 296/183 |
| 4,222,606 | 9/1980 | Brown et al. | 296/183 |
| 4,288,957 | 9/1981 | Meehan | 105/422 |

*Primary Examiner*—Robert R. Song
*Attorney, Agent, or Firm*—Bachman and LaPointe

[57] ABSTRACT

With known vehicle superstructures of the above kind it has been found that in many cases relatively large amounts of deformation and damage to parts of the floor and walls occur even when the collision is very slight, that the thermal insulation is inadequate and that noises are produced in the sidewalls and floor due to vibrations during the journey.

With the new vehicle superstructure the external forces acting on the sidewalls are no longer transmitted directly to the floor but reduced to a minimum level, which in most cases does not damage the floor, by means of a close-fit connection with built-in buffer zone. Also, the new design improves thermal insulation and markedly reduces the noises produced in the superstructure during a journey. Furthermore, the parts which have to be repaired can be readily removed and replaced.

9 Claims, 7 Drawing Figures

SUPERSTRUCTURE FOR ROAD AND RAIL VEHICLES

BACKGROUND OF THE INVENTION

The present invention relates to a superstructure for road and rail vehicles, in particular the arrangement of the sidewalls and floor of the superstructure.

In known vehicle superstructure designs of the above mentioned kind it has been found that in many cases the thermal insulation is inadequate and that disturbing noises are produced from the sidewall parts and the floor due to vibrations while the vehicle is in use. Furthermore, it has been found in practice that even slight collisions can cause a relatively large amount of damage and deformation to the floor and sidewall parts. The foregoing could be markedly reduced by altering the design.

It is therefore an object of the invention to develop a superstructure for road and rail vehicles, by means of which the thermal insulation and sound proofing are improved, the deformation of the wall parts and floor in relatively slight collisions is noticeably reduced, and the wall parts are easier to change and replace than was the case up to now.

SUMMARY OF THE INVENTION

This object is achieved by way of the present invention in that a longitudinal beam of a vehicle superstructure frame forms a unit with a sidewall, and the floor forms with a cross-beam, which can be joined securely to a chassis, another unit. Both units are joined by an arrangement of an elastic element between them, and by clamping action in order to keep them together in an essentially horizontal plane such that they are held in place due to a close frictional fit.

BRIEF DESCRIPTION OF THE DRAWINGS

The following figures show exemplified embodiments of the invention in a simplified, diagrammatic form wherein.

DETAILED DESCRIPTION

Figure 1:
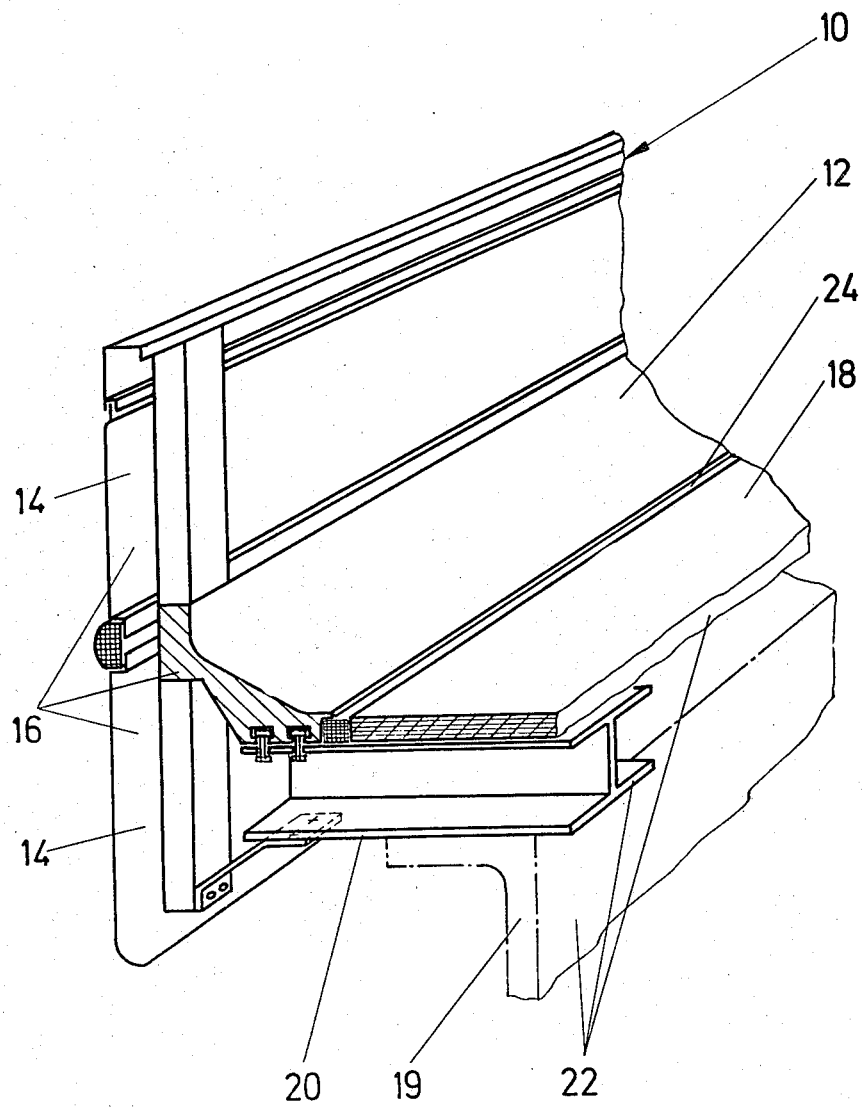
FIG. 1: A sectioned, perspective view showing a sidewall joined securely to a longitudinal beam of the superstructure frame of a vehicle and the floor of the vehicle superstructure joined securely to a cross-beam, both units being joined in an essentially horizontal plane by clamping action in order to keep them together in this plane to provide a close frictional fit.

In the vehicle superstructures 10 according to FIGS. 1-7 a longitudinal beam 12 provided on each side of a vehicle in the superstructure frame, not shown here, is joined to a sidewall 14 forming a unit 16, and a floor 18, with a cross-beam 20, which can be joined securely to a chassis 19 forming another unit 22. The two units 16 and 22 are in turn joined together, with an elastic element 24 between them, by clamping them together by means of threaded bolts 38 and nuts 42 in an essentially horizontal plane such that they are held in place due to close frictional fit.

Figure 2:
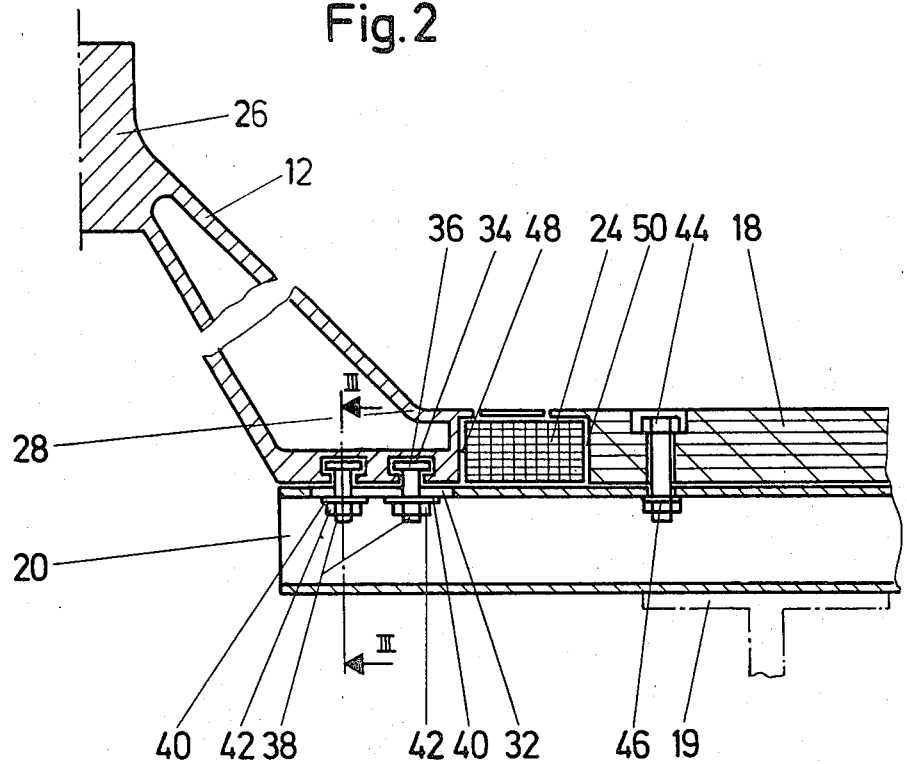
FIG. 2: A cross section through the longitudinal beam of a vehicle superstructure frame and through the floor and cross beam, in particular through the connection between the longitudinal beam of the frame and a cross-beam.
Figure 3:
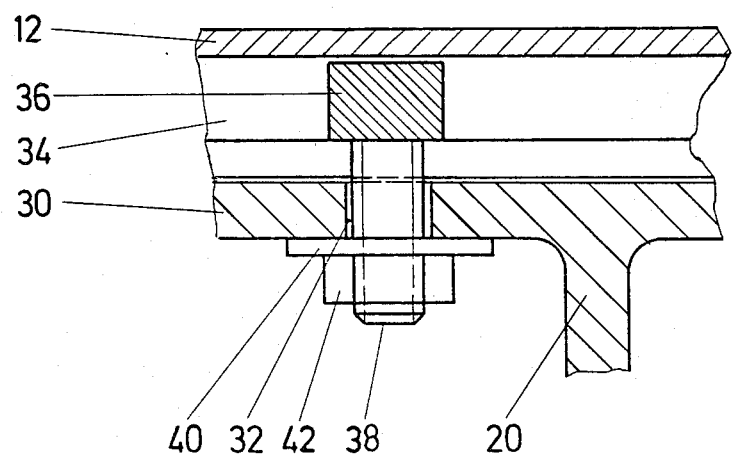
FIG. 3: A cross-sectional view through the longitudinal beam and cross-beam shown in FIG. 2, along line III—III but on a larger scale.

As shown in FIGS. 2 and 3 the longitudinal beam 12 which serves as lower support member is designed such that it can be joined in a simple manner to the floor 18 of the vehicle superstructure.

Figure 5:
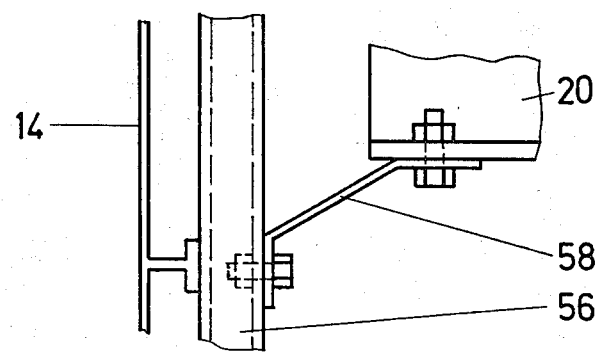
FIG. 5: An elastic, spring-like connection between a beam close to the sidewall and a cross beam of the vehicle superstructure.
Figure 6:
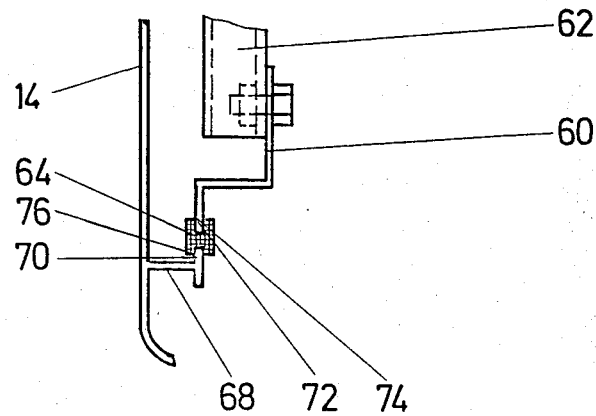
FIG. 6: Another exemplified embodiment of an elastic, spring-like connection between a beam close to the sidewall and a sidewall.

For this reason the longitudinal beam 12, as viewed in cross section, is angular in shape and is such that profiled struts 56 and 52 as shown in FIGS. 5 and 6 pointing upwards and downwards connect up to the vertical part 26 of the beam 12, while a unit 22 comprising the floor 18, a chassis 19 and cross beam 20, is joined to the essentially horizontal part 28 of the beam.

The cross-beams 20 feature on flange 30 elongated holes 32 through which threaded bolts 38 pass, and such that, the heads 36 of the bolts 38 can be slid into undercut grooves 34 in the underside of the longitudinal beam 12. The bolts 38 are pushed through ring-shaped washers 40 which press against the underside of the flange 30 when the nuts 42 on the bolts 38 have been made tight. Such an arrangement, with the undercut grooves 34 and elongated holes 32, makes possible a relative movment between the longitudinal beam 12 and the transverse beam 20.

The floor 18 is in the form of a flat sheet or board and is joined securely to the cross-beam 20 by means of threaded bolts 44 and nuts 46.

Between both parallel edges 48 and 50 of the longitudinal beam 12 and the floor 18 is an element 24 which is made of an elastic material and serves to prevent the forces arising in a collision from being transmitted in full magnitude from the longitudinal beam 12 of the superstructure 10 to the floor 18, which is designed to give rise to very little vibration.

Figure 4:
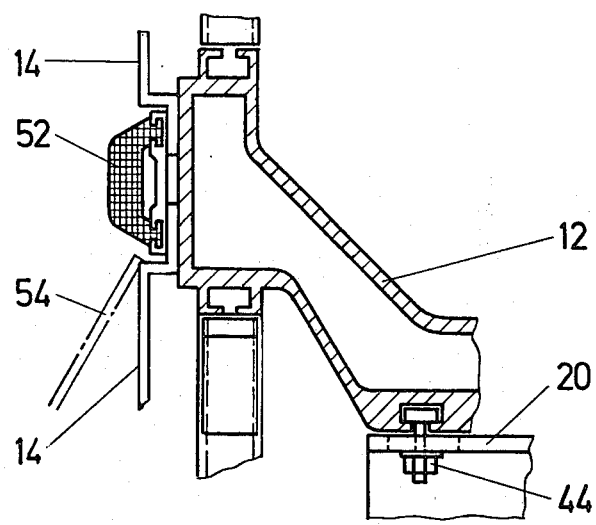
FIG. 4: A cross-sectional view through the longitudinal beam in the vehicle superstructure, with an elastic strip provided running in the same longitudinal direction.

In a further exemplified embodiment, as shown in FIG. 4, it is possible to secure to the outside of the beam 12 a shock-absorbing strip 52 made of an elastic material.

Below the strip 52, in a certain region and in a manner not shown here, a tiltable part in the form of a flap 54 can be provided to open or close a compartment-not shown here.

As shown in FIG. 5, leaf-springs 58 bent at through a right-angle are attached at one end to the underside of the cross-beam 20 and at the other end to the inner side of a beam 56 in the frame of the vehicle superstructure. This spring is also designed to prevent the forces of deformation which arise in a collision from being transferred in their full magnitude to the floor which is designed to give rise to very little vibration.

In a further exemplified embodiment shown in FIG. 6 a leaf-spring 60 is bent to an S-shape and connected at one end to a beam 62 of the superstructure frame and at the other end via a strip-shaped elastic element 64 to the lower end 68 of a sidewall 14. The S-shaped leaf-spring 60 and the element 64 serve basically to reduce the forces resulting from a sidewall collision acting on the beam 62 of the frame.

The sidewall 14 features on its inner side a T-shaped flange 68 which runs in the longitudinal direction and the upper end 70 of which points towards the lower end 72 of the S-shaped leaf-spring 60.

The elastic, strip-shaped element 64 is inserted between the lower end 72 of the S-shaped leaf-spring 60 and the upper end 70 of the flange 68 of the sidewall 14. The element 64 features longitudinal grooves 74 and 76 into which the lower end 72 of the S-shaped leaf-spring 60 and the upper end 70 of the flange 68 on the sidewall 14 are inserted. The transmission of undesirable noises due to vibrations in the chassis 19 during driving, is effectively dampened by the provision and arrangement of the strip-shaped element 64.

Figure 7:
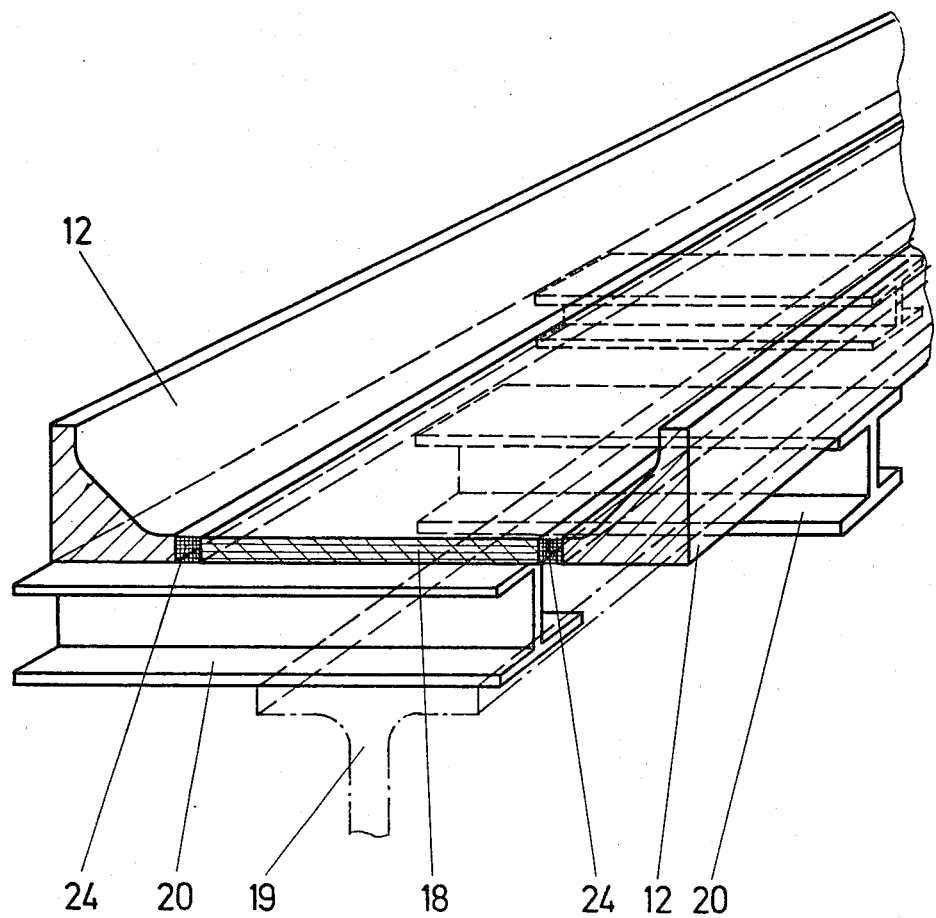
FIG. 7: Essentially, the arrangement and design of cross-beams which serve to connect the sidewall and the floor.

FIG. 7 shows the essential arrangement and design of the cross-beams 20 which are a component part of the chassis 19 and which—as viewed in the longitudinal direction along the vehicle superstructure—extend alternately from the left longitudinal beam 12 to the elastic element 24 on the right side of the floor 18 and from the right longitudinal beam 12 to the elastic element 24 on the left side of the floor 18.

The present invention is not limited to the exemplified embodiments shown here. It is, for example, also possible within the scope of the invention to employ elastic elements of different design between the superstructure frame and the floor of the vehicle, if this is desired.

With the new design of vehicle superstructure it is now, usefully, possible to reduce markedly the noises produced in the superstructure during use. All sidewall parts and the supporting parts can be readily dismantled so that damaged parts can be changed at relatively low cost.

Forces acting on the sidewalls form outside are no longer transmitted directly to the floor, but by means of a close-fit connection with built-in buffer zone are reduced to a minimum level, which in most cases does not cause damage to the floor.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A superstructure for a vehicle comprising at least one longitudinal beam, a sidewall secured to said longitudinal beam so as to form a first unit, a cross-beam, a floor member secured to said cross-beam so as to form a second unit, buffer means provided between said first unit and second unit for reducing shock due to contact and means for securing said first unit to said second unit such that said first unit can slide with respect to said second unit parallel and transverse to the longitudinal axis of said longitudinal beam.

2. A superstructure according to claim 1 wherein said buffer means comprises an elastomeric element characterized by a high degree of incombustibility.

3. A superstructure according to claim 1 wherein said means for securing said first unit to said second unit comprises at least one undercut groove provided on said at least one longitudinal beam, at last one elongated hole provided on said cross-beam, at least one threaded bolt having a head portion received in said at least one undercut groove and a shank portion projecting from said head portion through said at least one elongated hole and a nut thread on said shank so as to press against the underside of said cross-beam and secure said first unit to said second unit.

4. A superstructure according to claim 3 wherein a ring-shaped washer is fitted over said shank portion so as to press against the underside of said cross-beam when said nut is tightened.

5. A superstructure according to claim 1 wherein said longitudinal beam and said floor have substantially parallel edges and said buffer means is provided between said parallel edges.

6. A superstructure according to claim 1 wherein additional buffer means is provided on the outside of the longitudinal beam in the area of said sidewall.

7. A superstructure according to claim 1 further including a spring joined at one end to said cross-beam and at the other end to a portion of said longitudinal beam.

8. A superstructure according to claim 7 further including a second spring joined at one end to said portion of said longitudinal beam and at the other end to the lower part of said sidewall.

9. A superstructure according to claim 8 further including buffer means between said second spring and said sidewall.

* * * * *

UNITED STATES PATENT AND TRADEMARK OFFICE
CERTIFICATE OF CORRECTION

PATENT NO. : 4,357,048
DATED : November 2, 1982
INVENTOR(S) : Jurg Zehnder and Jann Grischott It is certified that error appears in the above-identified patent and that said Letters Patent are hereby corrected as shown below:

Column 4, Claim 3, Line 20, change "last" to read --least--.

Signed and Sealed this

Twenty-eighth Day of December 1982

[SEAL]

Attest:

GERALD J. MOSSINGHOFF

Attesting Officer          Commissioner of Patents and Trademarks